United States Patent
Marcy et al.

(10) Patent No.: US 11,371,808 B2
(45) Date of Patent: Jun. 28, 2022

(54) BOAT GATE

(71) Applicant: Truston Technologies, Inc., Annapolis, MD (US)

(72) Inventors: Matthew Allen Marcy, Bluemont, VA (US); Erick Benjamin Knezek, Lafayette, LA (US); Mark Herbert Wood, Tarpon Springs, FL (US); Christopher Paul Pacheco, Portsmouth, RI (US)

(73) Assignee: OCEANETICS, INC., Anapolis, MD (US)

( * ) Notice: Subject to any disclaimer, the term of this patent is extended or adjusted under 35 U.S.C. 154(b) by 0 days.

(21) Appl. No.: 16/331,878

(22) PCT Filed: Sep. 15, 2017

(86) PCT No.: PCT/US2017/051757
§ 371 (c)(1),
(2) Date: Mar. 8, 2019

(87) PCT Pub. No.: WO2018/053249
PCT Pub. Date: Mar. 22, 2018

(65) Prior Publication Data
US 2019/0212103 A1 Jul. 11, 2019

Related U.S. Application Data

(60) Provisional application No. 62/395,471, filed on Sep. 16, 2016.

(51) Int. Cl.
*F41H 11/05* (2006.01)
*E05B 51/02* (2006.01)
(Continued)

(52) U.S. Cl.
CPC .............. *F41H 11/05* (2013.01); *E05B 51/02* (2013.01); *E06B 11/021* (2013.01); *G05D 1/0011* (2013.01); *G05D 1/0206* (2013.01)

(58) Field of Classification Search
CPC ....... F41H 11/05; E05B 51/02; G05D 1/0011; G05D 1/0206; E06B 11/021
See application file for complete search history.

(56) References Cited

U.S. PATENT DOCUMENTS 5,978,379 A * 11/1999 Chan ..................... H04L 49/357
370/403
6,000,020 A * 12/1999 Chin ................... G06F 11/1456
714/E11.12

(Continued)

*Primary Examiner* — Frederick M Brushaber
(74) *Attorney, Agent, or Firm* — Law Office of Jesse D. Lambert, LLC

(57) ABSTRACT

A boat gate system for controlling vessel access to a port or similar waterbody has a number of connected, floating Port Security Barrier ("PSB") segments. A remote latching and unlatching mechanism, combined with a powered mover mounted on one or more PSB segments, permits remote unlatching of the PSB segments; moving the PSB segments to a desired location (whether rotating same about a point, or moving a longer section laterally) so as to open the PSB, then moving the PSBs back to a closed position and latching same. Both the unlatching, movement, and latching are remotely controlled. Positional indicators, for example Global Positioning Systems or similar systems, are provided to monitor and assist in controlling PSB segment movement and unlatching, and movement of the PSB segments in a desired direction to a desired location.

16 Claims, 9 Drawing Sheets

(51) Int. Cl.
  *E06B 11/02*   (2006.01)
  *G05D 1/00*    (2006.01)
  *G05D 1/02*    (2020.01)

(56) References Cited

U.S. PATENT DOCUMENTS

| | | | | |
|---|---|---|---|---|
| 8,297,884 | B1* | 10/2012 | Khachaturian | B63B 35/00 |
| | | | | 405/195.1 |
| 10,145,659 | B1* | 12/2018 | Osienski | E02B 3/04 |
| 2004/0018060 | A1* | 1/2004 | Knezek | F41H 11/05 |
| | | | | 405/215 |
| 2008/0294309 | A1* | 11/2008 | Kaprielian | G01S 17/86 |
| | | | | 342/357.31 |
| 2009/0035068 | A1* | 2/2009 | Terai | B63G 9/04 |
| | | | | 405/211 |
| 2010/0018264 | A1* | 1/2010 | Nygren | E05C 19/003 |
| | | | | 70/91 |
| 2012/0091412 | A1* | 4/2012 | Bishop | F41H 11/05 |
| | | | | 403/292 |
| 2015/0110546 | A1* | 4/2015 | Knezek | F41H 11/05 |
| | | | | 403/220 |
| 2016/0002975 | A1* | 1/2016 | Knezek | E05D 7/00 |
| | | | | 405/71 |
| 2016/0134379 | A1* | 5/2016 | Tehranchi | H04B 15/005 |
| | | | | 455/63.1 |
| 2019/0212103 | A1* | 7/2019 | Marcy | E06B 11/021 |

* cited by examiner

BOAT GATE

CROSS REFERENCE TO RELATED APPLICATIONS

This non-provisional patent application claims priority to U.S. provisional patent application Ser. 62/395,471, filed Sep. 16, 2016, for all purposes. The disclosure of that provisional patent application is incorporated herein, to the extent not inconsistent with this application.

BACKGROUND

Field of the Invention

This invention relates to systems for controlling access by marine vessels or boats to a controlled area, such as a port or harbor. Such systems are at times referred to as Port Security Barrier ("PSB") systems.

Generally, PSB systems comprise a structure existing across a waterway. The structure may be grounded to the earth underlying the water body, referred to herein as the seafloor, for example pilings or the like driven into the seafloor. Alternatively (or in combination with the grounded structures), floating barriers may comprise the controlling structure.

A common requirement of all PSB systems is that an opening be provided to permit desired vessel traffic into and out of the port. Typically, some form of movable gate is provided to control vessel passage through the opening. Depending on the structure of the overall system, the gate may be hinged to and suspended from a piling or the like driven into the seafloor, or may comprise one or more segments of a floating PSB and be hinged and connected to some floating structure.

As can be readily understood, some means of unlatching the gate, moving the gate to an open position and back to a closed position, and latching same in a closed position, must be provided. Prior art gates often required personnel in a service vessel to unlatch/latch a locking system, and to tow a string of floating PSB modules with a boat, away from a termination point (to open) or to a termination point where the PSB segment is latched in place (to close). When closed, the PSB units present an uninterrupted string of barriers protecting a port or harbor.

The process of manually latching and unlatching a PSB unit so that a gate can be opened and closed and of moving the PSB units to/from an open position introduces many safety hazards. Since both the barrier/gate itself and the boat pulling the barrier unit/gate are in constant motion on the water, the possibility for personnel latching/unlatching the barrier unit to pinch or smash fingers, hands, wrists, arms, feet, ankles or legs is a very real and present danger in each latching/unlatching operation. In addition, due to this safety issue, there are instances where barrier operators do not properly latch the gate; this causes the protection of the barrier system to be compromised. Further, the PSB unit may be temporarily tethered to the boat to move it, introducing its own set of potential issues and hazards.

An exemplary prior art PSB system is shown in FIGS. 1-4. The individual floating PSB barrier units or segments are attached to each other via semi-compliant connectors with both tensile and compressive properties. These attached barrier units form "strings" which are attached to various moorings anchored to the ocean floor, and some form of termination structure, which may also be anchored to the sea floor. FIG. 1 shows a typical prior art arrangement of a PSB system. 1, comprising a plurality of Port Security Barrier Units (PSB) units 100, connected by PSB connectors 102, best seen in FIG. 3; one or more buoys 120, to support an end of a string of PSBs; one or more PSB terminations 130, holding an end of a PSB string; mooring(s) 140, to hold buoy 120 in place; a latch connector 150; and a latch receiver 160. As can be seen in FIG. 1, a string of PSB modules across an opening, and that will be moved to form the opening, forms PSB gate segment 170. FIG. 2 shows a bigger picture of a typical latch connector 150 between a PSB unit and a latch receiver 160.

Known prior art PSB systems are "passive" in the sense that the system has no integral or self contained powered components to unlatch/latch the PSB gate, and to provide movement of the system or of the strings of PSB segments in a controlled fashion. To open a gate so that vessels can move into and out of the protected area of the barrier system, a typical sequence includes the following steps:

- A string of PSB units 100 must be unlatched at one end from a latching point (typically at a mooring point or termination point, e.g. buoy 120). FIG. 2 shows a typical prior art latch mechanism. Typically, this unlatching process is done manually, by personnel in a vessel.
- Referring to FIG. 3, once PSB string (e.g. in conjunction with PSB gate segment 170) is unlatched, it must be tied off to vessel 180 using tow lines 182.
- FIG. 4 shows vessel 180 towing the PSB gate segment 170 laterally away from the latching point (i.e. swinging it) creating an opening. The size of the opening may vary depending upon vessel size. As can be readily understood, the process is reversed to close PSB gate segment 170 and to latch same in place.

As noted above, the process of latching and unlatching a PSB string is a dangerous operation as the PSB string and the vessel are in constant motion on the water and not always in synchronous motion. Furthermore, because this latching process is dangerous, there are circumstances where PSB operators do not follow operating procedures, and instead latch the gate segment in a way that compromises the integrity of the entire barrier system. Additionally, the process of latching and unlatching combined with the requirement to tie off the tow lines to the vessel for opening and then to remove the tow lines from the vessel when the PSB string is returned and closed is very time consuming and has its own set of particular hazards.

The known prior art PSB boat gate systems all present various issues, giving rise to a desire for an improved boat gate system that addresses these issues.

SUMMARY OF THE INVENTION

The boat gate system embodying the principles of the present invention fundamentally comprises a means of remotely latching and unlatching a PSB gate segment, combined with a means for moving the PSB gate segment to a desired position and back to a latched position, the means for moving the PSB segments being self-contained on the PSB segment and remotely operable, both as to direction and force/speed. In a preferred embodiment, one or more of the PSB segments in a new or existing PSB system will comprise the remote latching/unlatching and motive apparatus, thereby modifying that segment into a barrier latching unit (BLU).

In one embodiment, the BLU comprises a remote controlled latching mechanism and remote controlled thrusters; the thrusters are configured to move the PSB string laterally away from the other portion of the latching mechanism (that is, in an arcuate direction, swinging the PSB gate segment away from its latched position) as well as axially (in effect, pulling on it along its axis), so as to keep the catenary in the string such that the PSB modules do not turn back on themselves. The thrusters would be driven by power units mounted on the PSB segment, or alternatively mounted on a nearby fixed structure (e.g. a pier) or on a floating platform. Additional thrusters may be provided along the length of the PSB gate segment, to maintain a desired position of the gate segment. In still further embodiments, the gate may comprise a long section of PSB segments, that is unlatched at both ends, then moved axially aside (rather than being "swung open"), perhaps along a fixed portion of the PSB, providing a very wide opening, while not unnecessarily blocking other passageways. Appropriate control systems are provided to control and monitor the latching status and PSB gate segment position, including but not limited to GPS positioning systems and/or other positioning systems known in the art, including but not limited to LiDAR, GPS/LiDAR, or other combinations thereof. The system also comprises appropriate controls, digital processors and the like as required, to enable the remote monitoring and control of the overall system components.

BRIEF DESCRIPTION OF THE DRAWINGS

FIG. 1 is a view of a prior art PSB system, showing various components thereof, as previously described.

FIG. 2 is a detailed cross section view of a prior art latch mechanism for a PSB gate.

FIG. 3 shows a prior art PSB unit connected to a tow vessel via tow lines.

FIG. 4 shows the tow vessel towing the barrier string laterally away from the latch receiver, in a prior art system as described above.

FIG. 5 shows various elements of one embodiment of the invention, referred to herein at times as a Barrier Latching Unit (BLU).

FIG. 6 depicts the remote controlled latch mechanism releasing the latch bar.

FIG. 7 depicts the remote controlled means for moving the PSB gate segments, namely the thrusters of the present invention, moving the PSB barrier string away from the latch bar.

FIG. 8 is a view of another embodiment of the present invention, showing a longer gate with additional thrusters ("mid string thrusters") added to PSB modules between the BLU and the pivoting portion of the barrier string.

FIG. 9 shows an automated gate with two BLU units (one on each end) with the PSB gate segment moved out of the opening and positioned parallel to an existing string.

DESCRIPTION OF THE PRESENTLY PREFERRED EMBODIMENT(S)

While various boat gates can embody the principles of the present invention, with reference to the drawings some of the presently preferred embodiments can be described.

Figure 1:
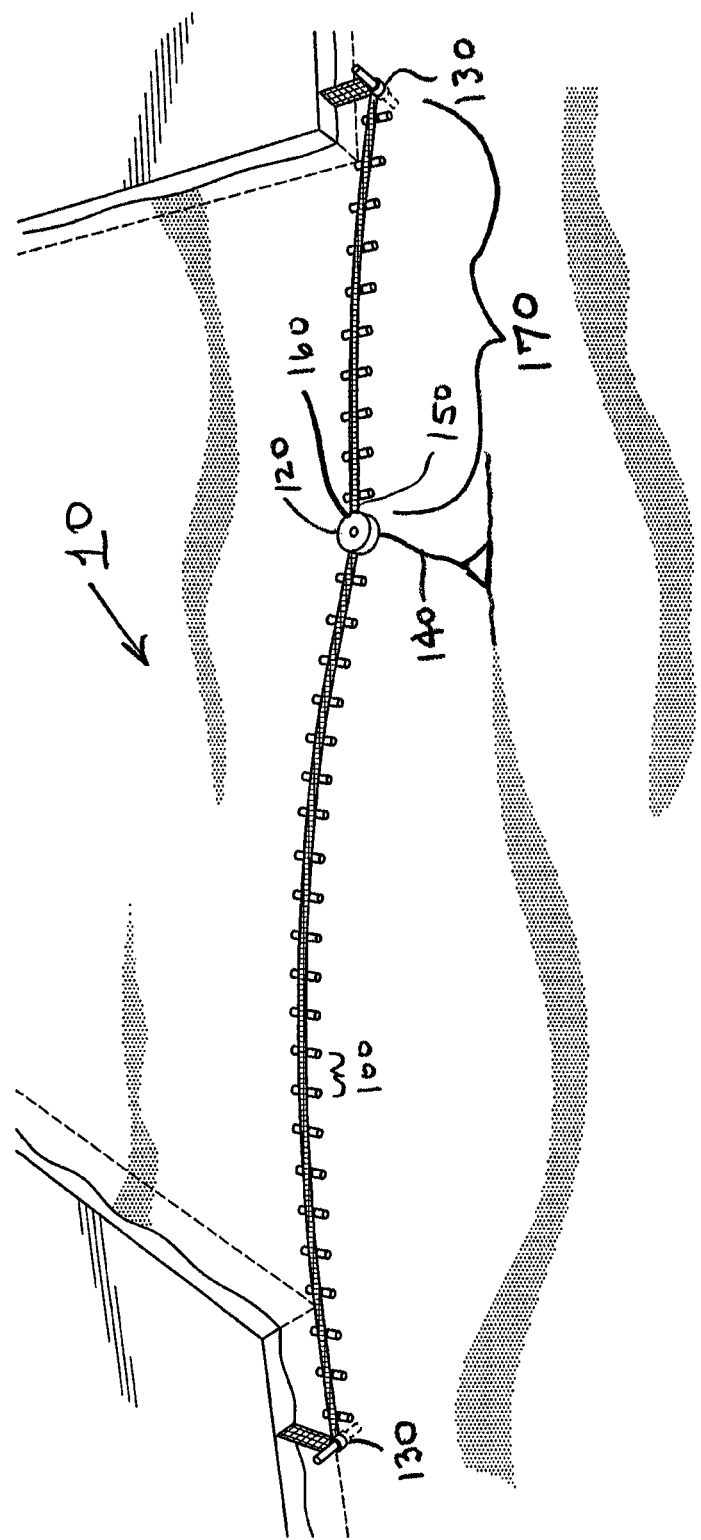
FIGS. 1-4 show various elements of prior art PSB systems as described above.
Figure 2:
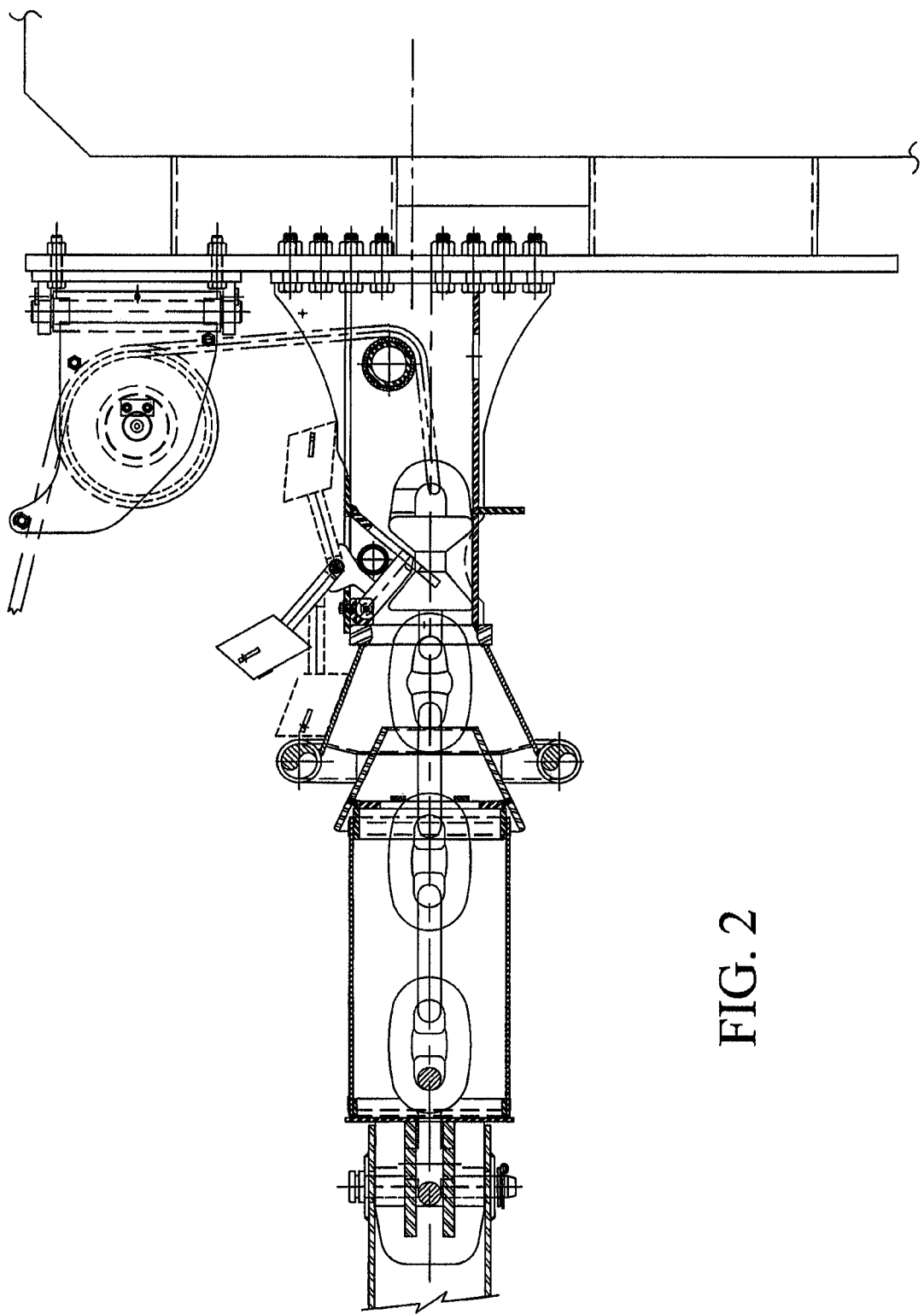
Figure 3:
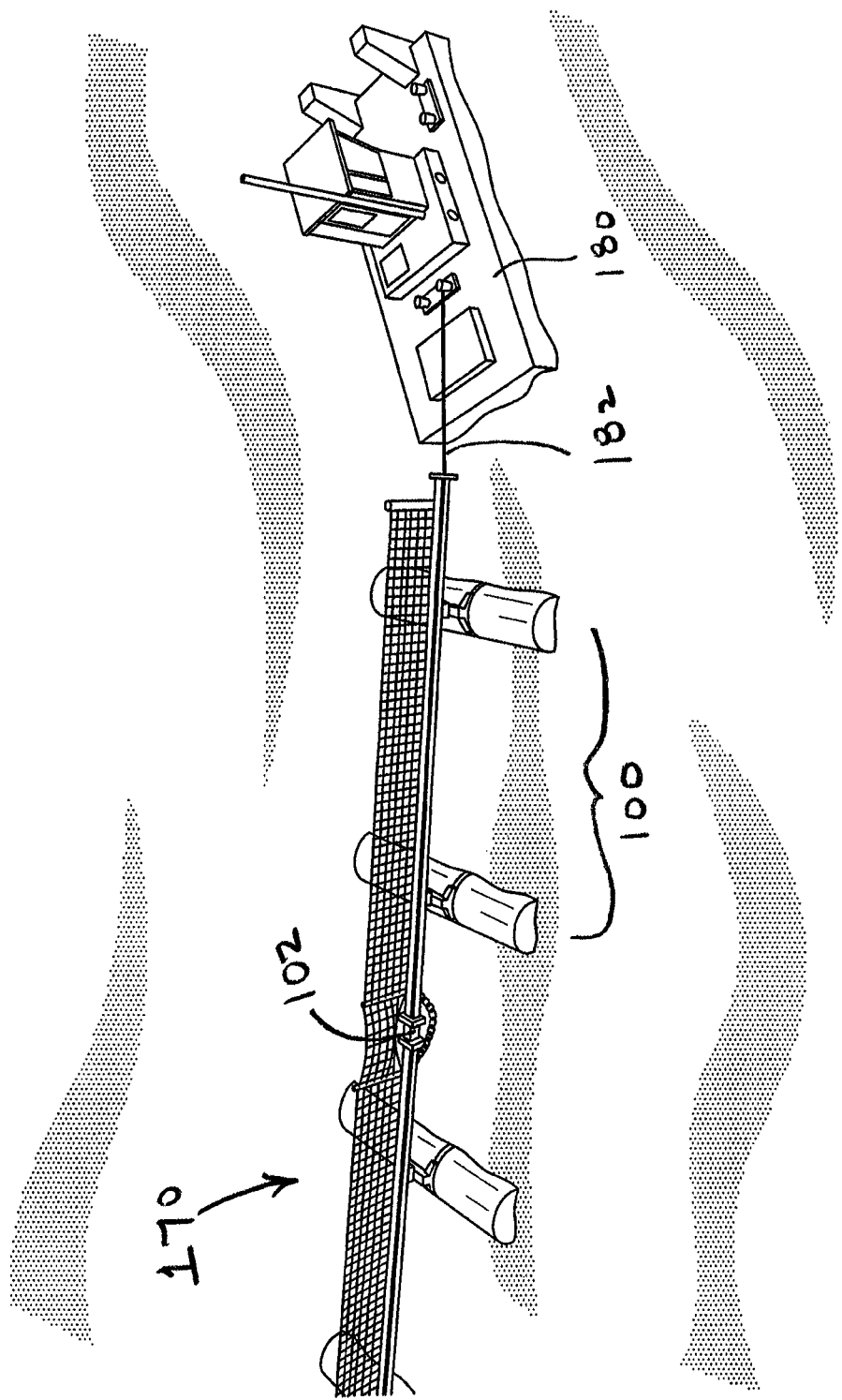
Figure 4:
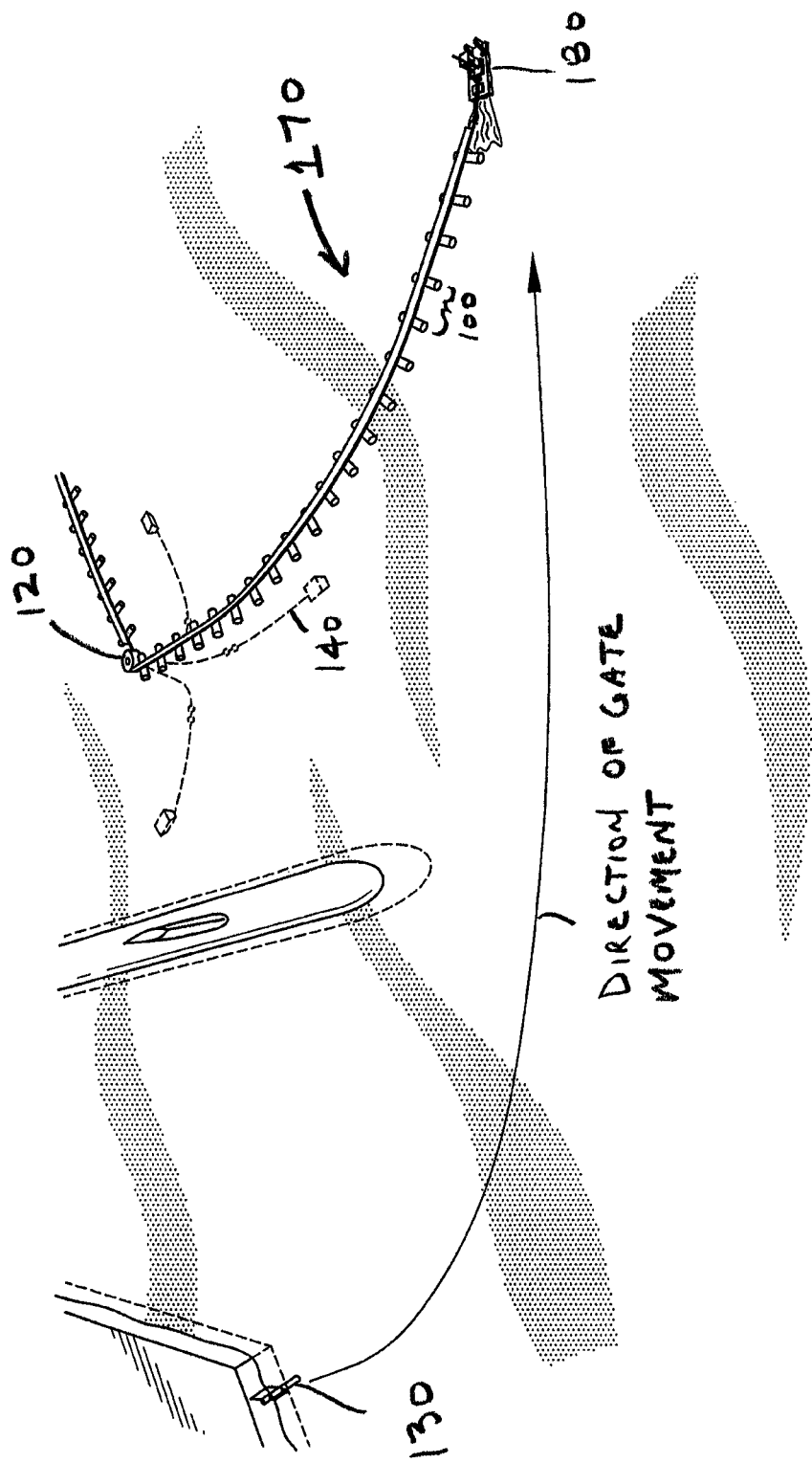
Figure 5:
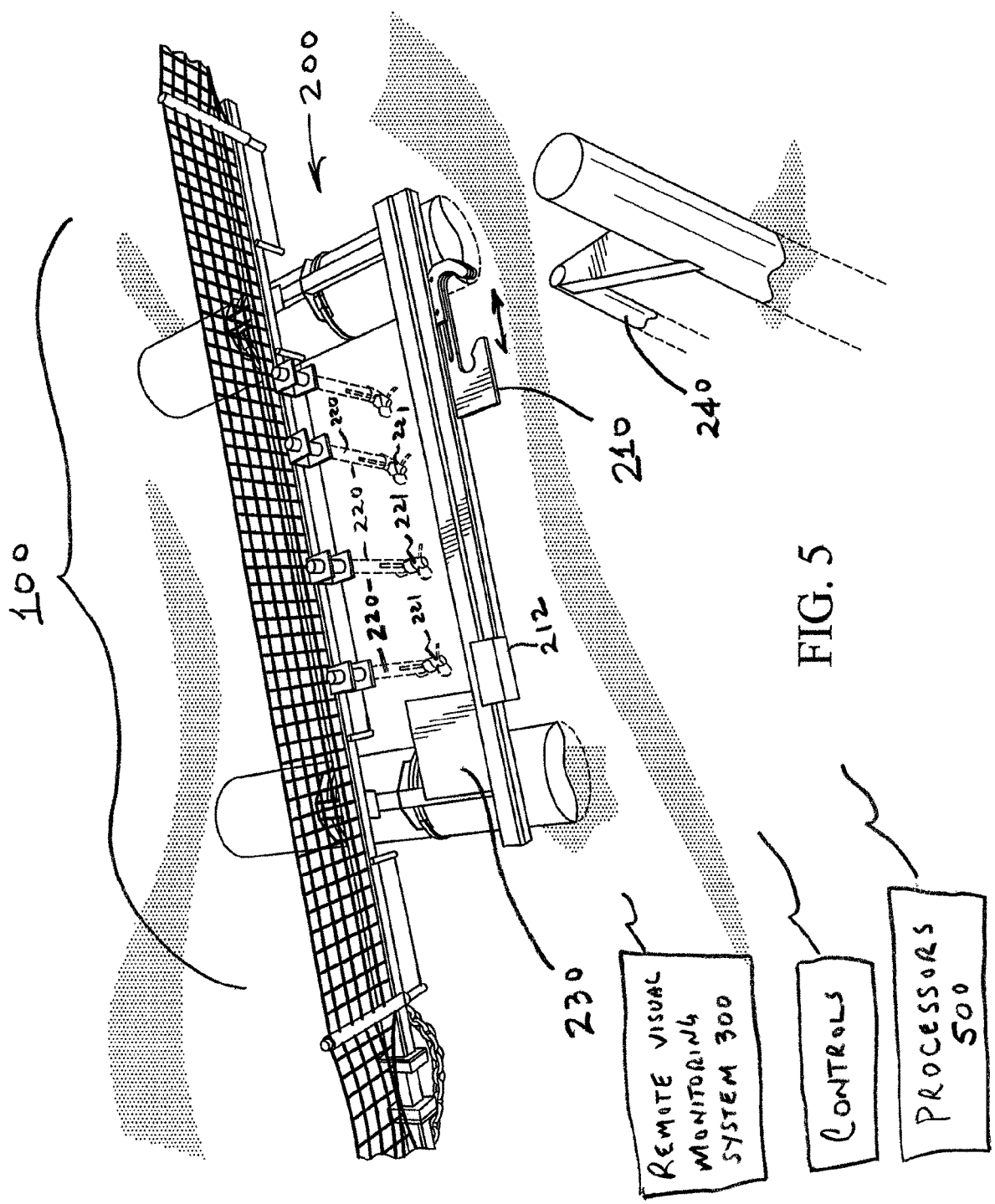
FIGS. 5-9 show various elements of embodiments of the present invention. In particular.
Figure 6:
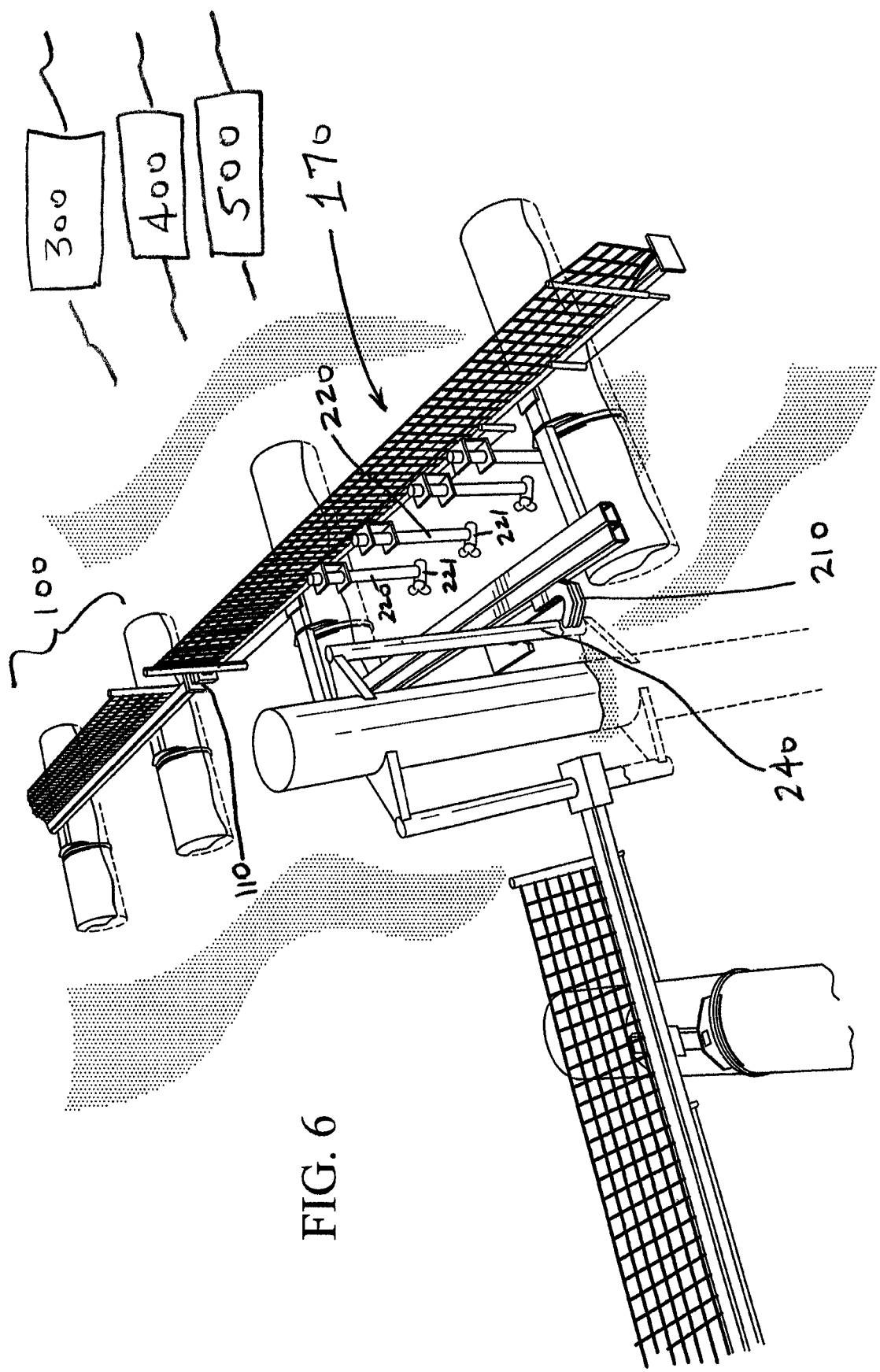

Referring to FIGS. 5 and 6, these figures show various elements which may be installed onto a PSB segment to form a BLU, in one embodiment of the present invention. A remote controlled latching mechanism comprises a latch 210, which may be a sliding throated element as shown or a similar structure, which engages and locks to a captured element 240, in order to latch the gate closed. Captured element 240 may be a fixed position element, on a piling or the like; alternatively may be an element mounted on a float that is free to move up and down with water level, but that is constrained around a piling; or alternatively may be a floating element. It is understood that other arrangements known in the art may be used to connect components and form a remotely operable latch and gate. Remotely operable latch movement means 212 are provided so that latch 210 may be latched/unlatched without personnel actually handling latch 210 during operation. Remotely operable latch movement means 212 may comprise any means known in the art to generate axial movement of latch 210. For example, remotely operable latch movement means 212 may comprise a hydraulic cylinder, with appropriate hydraulic fluid source; a powered lead screw arrangement; a powered rack and pinion gear arrangement; or a powered chain and sprocket arrangement. The scope of the present invention comprises any and all of such mechanisms. Appropriate electrical or other power to operate the latch movement means may be provided by power unit 230, described in more detail below. It is understood that latch 210 may be positioned on either side of the PSB segment/fixed point interface; said another way, latch 210 may be mounted on the floating PSB segment as shown; or alternatively mounted on a fixed element, in which case the captured portion 240 is on the floating PSB segment. It is further understood that although a sliding element is shown in FIG. 5, the present invention and the remotely operable latch movement means encompasses any form of remotely operable latching/locking mechanism, suitable for use in a marine environment.

Also referring to FIGS. 5 and 6, another key element of the present invention is a remotely operable, self contained means for moving the PSB segment(s) away from their latched position, so as to open the gate for vessel passage; then move the segments back to the latched position, generally referred to as thruster unit 200. One embodiment comprises a plurality of powered thrusters 220, for example comprising propeller units driven by motors, 221. Power is provided to thrusters 220 by a power unit 230, which may be mounted on the PSB segment as shown in the figures, or alternatively on a nearby fixed pier or the like, or on an adjacent floating barge. Power unit 230 may be an internal combustion engine driven unit; or alternatively power cables/lines could be run from a shore-based power source. Alternatively, power unit 230 may comprise a battery bank, for example placed in a weatherproof container on the BLU or otherwise, and recharged through connected solar panels or by other means. It is to be understood that the scope of the present invention encompasses the propeller units being powered by electric, hydraulic, or any other means or combination thereof, and further encompasses any means of providing electrical or other sources of power to drive the thrusters and operate the latching means. Thrusters 220 may comprise jet type propulsion units.

Thrusters 220 may be positioned and directionally controlled, e.g. by rotating the direction of the propeller units 221, and may be controlled as to thrust level via control of propeller RPM or the like, so as to move the PSB string laterally away from the other portion of the latching mechanism (i.e. in an arcuate direction), as well as to move the PSB string axially (or in any desired direction), to keep the catenary in the PSB string such that the PSB modules 100 do not turn back on themselves. Appropriate controls, digital processors and the like are are provided to enable control of thrusters 220 in a remotely operable fashion.

As noted above, a captured portion of the latching mechanism is installed in place of the current PSB-style latch receiver, see element 240 in FIG. 5. This captured portion of the latching mechanism will be the fixed point that the BLU latching mechanism 210 engages with so that the barrier resumes its fully closed and fully protected position.

Figure 7:
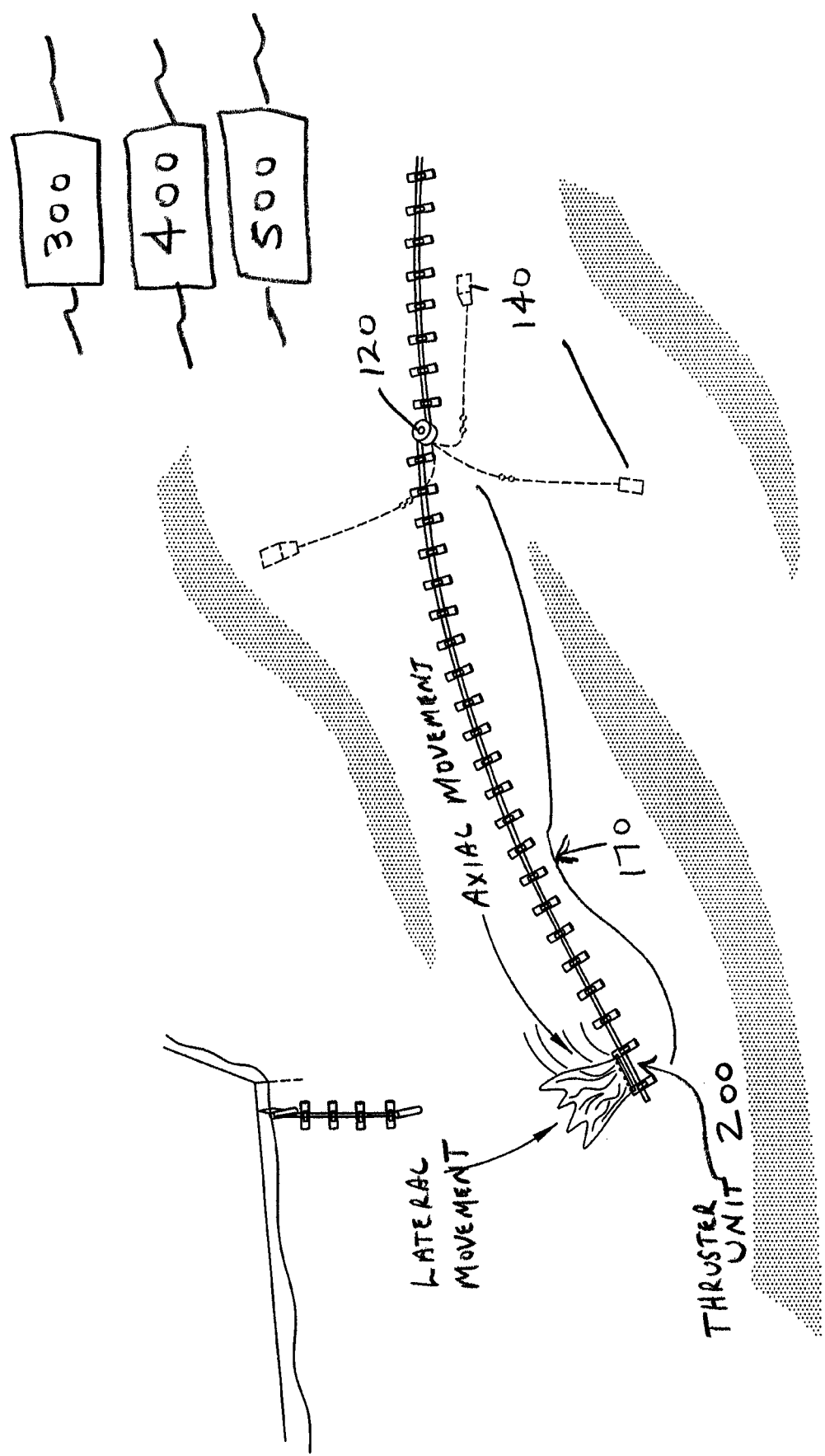
Figure 8:
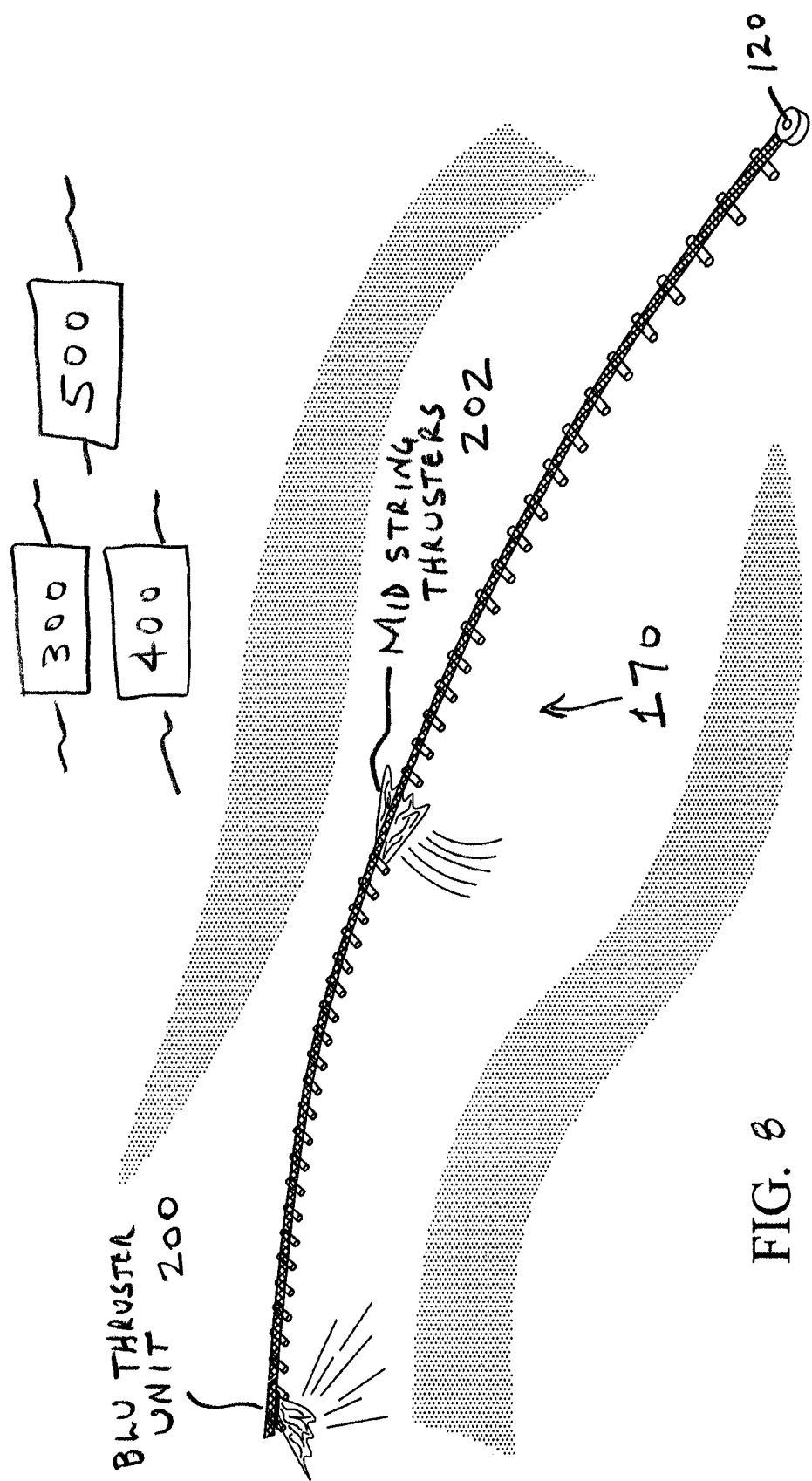

FIGS. 7 and 8 illustrate a sequence of release of the remote controlled latch from the captured portion of the latching mechanism and movement of the PSB gate segments. FIG. 7 shows how the remote controlled thrusters are moving the PSB gate segment 170 laterally away from the latching bar (swinging it out of its locked position), while simultaneously moving it axially (i.e. pulling on it), to maintain the proper catenary so that the PSB units to not fold back on themselves.

It is understood that additional sets of remotely controlled thrusters may be installed on other PSB modules along the length of the string. FIG. 8 shows additional thrusters arranged on additional modules along the length of the string (mid string thrusters 202) in addition to the BLU thrusters positioned substantially at the end of PSB gate segment 170; all sets of thrusters can provide both lateral and axial thrust. Multiple sets of thrusters operated remotely will allow the PSB operators to open much larger strings with many PSB modules that would act as a large ship gate to allow the passage of ocean-going Navy ships such as aircraft carriers.

Figure 9:
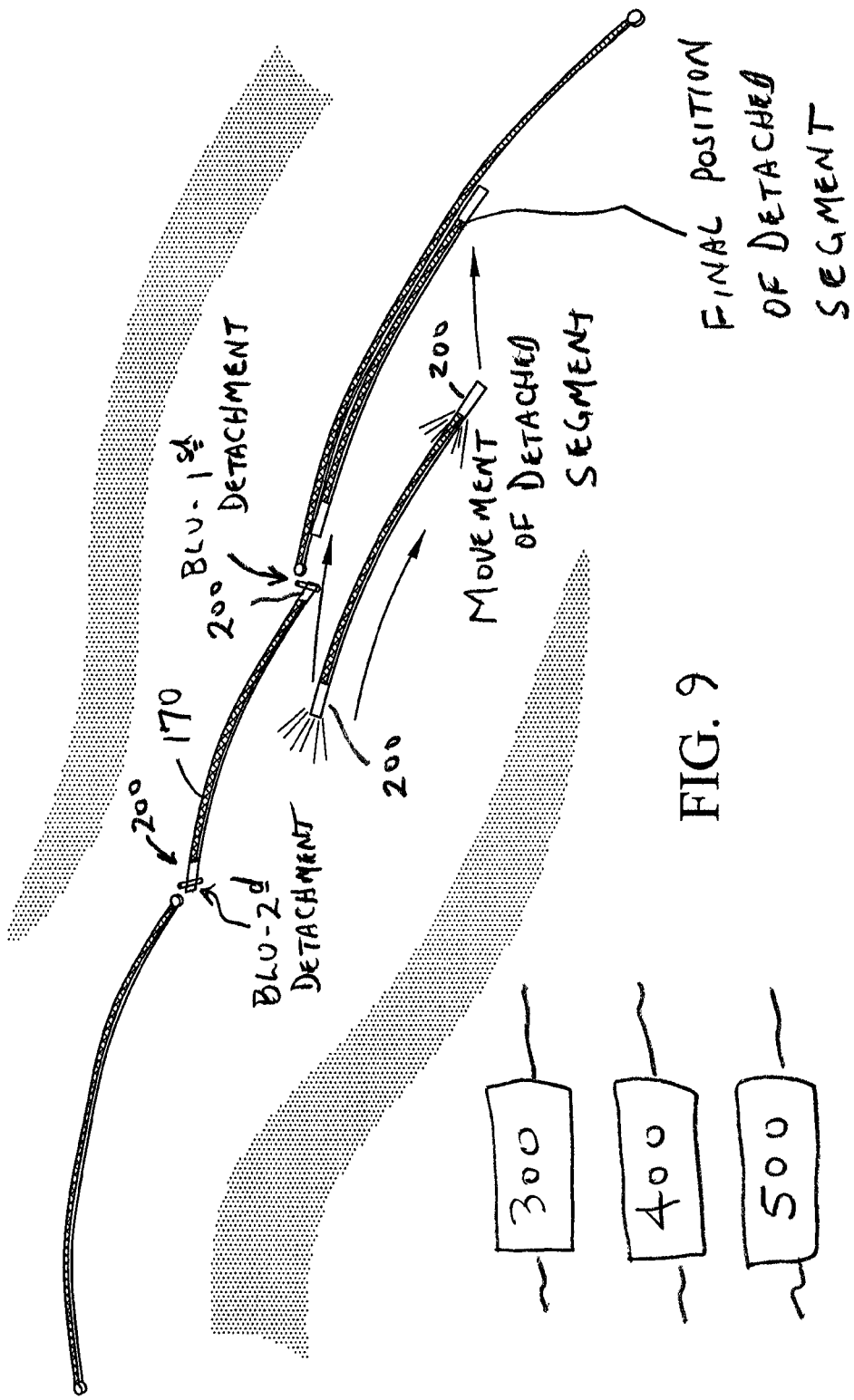

Certain applications require a very wide opening for passage of very large vessels, and consequently a very wide gate. It can be readily understood that opening of a very large gate, wherein one end of the gate is fixed and the other end is swung open (rotated around) the fixed end, requires a very large area to accommodate the swing of the gate (i.e. the large arc described by such movement). Yet another embodiment of the present invention comprises a string of PSBs, having a BLU with a remote-controlled latching mechanism on each end of the string, see FIG. 9. A typical sequence of operation of this embodiment would include one of the BLUs releasing from the captured portion of the latching mechanism and commencing movement of the barrier laterally away from the latching bar. At that time, the second BLU would be released from the other latching bar. Once both ends of the gate segment were thereby released, the gate segment may be moved laterally along the fixed parts of the PSB (or to any other desired location) by thruster units 200.

Various embodiments of the present invention may comprise other desired elements. For example, a remote visual monitoring system 300 (e.g., a closed-circuit television) may be used when the system operator is not within line-of-site of the PSB gate. Controls and feedback sensors 400 may be provided to monitor condition of the latch (whether open/close). One or more digital processors 500 are provided as required for system function.

Control of the thrusters may be include use of various positioning devices, including but not limited to global positioning systems (GPS), differential GPS, Light Detection and Ranging (LiDAR), a combination of GPS and LiDAR, and/or laser range finders, to control position of the gate, and of the latch system. In one embodiment, the system would release, move to a predefined location and "hover" in that location, then return to self-latch.

Broadly, the present invention encompasses a system which provides for remote and automated unlatching of a gate segment, and moving the gate segment to a desired location (whether swung out from a fixed pivot point, or moving a gate segment laterally when completely disconnected at either end), holding same in that location for a desired length of time, then moving the gate segment back into place and latching it closed.

CONCLUSION

While the preceding description contains many specificities, it is to be understood that same are presented only to describe some of the presently preferred embodiments of the invention, and not by way of limitation. Changes can be made to various aspects of the invention, without departing from the scope thereof.

Therefore, the scope of the invention is to be determined not by the illustrative examples set forth above, but by the appended claims and their legal equivalents.

We claim:

1. A remotely operable port security barrier system, comprising:
   one or more joined together floating port security barrier segments forming a string of port security barrier units;
   one or more means for remotely latching an end of said string of port security barrier units to a fixed point, and for remotely unlatching said end;
   one or more remotely operable means for moving at least one end of said string of port security barriers from its latched position and rotating same to another position, and rotating back to said latched position, and a power unit for powering said remotely operable means for moving at least one end of said string of port security barriers,
   wherein said one or more remotely operable means for moving at least one end of said string of port security barriers comprises one or more remotely operable thruster units, each of said thruster units comprising one or more propeller equipped units having controllable speed and directional functions;
   a positional guidance system whereby a position of said port security barrier string can be monitored and said remotely operable means for moving at least one end of said string of port security barriers controlled to position said port security barriers as desired; and
   a control system comprising a digital processor, said control system adapted to receive information from said means for remotely latching an end of said string of port security barriers and said remotely operable means for moving at least one end of said string, and send information for control of same.

2. The system of claim 1, wherein said means for remotely latching an end of said string of port security barrier units comprises an axially moveable latch adapted to engage and latch to a captured element.

3. The system of claim 2, wherein said means for remotely latching an end of said string of port security barrier units further comprises a hydraulic cylinder moving said axially moveable latch.

4. The system of claim 2, wherein said means for remotely latching an end of said string of port security barrier units further comprises a gear and lead screw arrangement.

5. The system of claim 1, wherein at least one of said thruster units is positioned proximal said means for remotely latching.

6. The system of claim 5, further comprising one or more thruster units positioned between ends of said port security barrier segment.

7. The system of claim 1, wherein said power unit is positioned on said port security barrier segment proximal said thruster unit.

8. The system of claim 1, wherein said power unit is positioned on a fixed structure with power cables routed to said thruster unit.

9. The system of claim 1, wherein a string of port security barriers comprises said one or more means for remotely latching and unlatching at each end, whereby said string can be disconnected from said fixed point at each end; and wherein said string of port security barriers comprises a remotely operable means for moving at least one end of said string of port security barriers at least at each end thereof, whereby said string when disconnected at each end may be first at least partially rotated out of its locked position then moved laterally from its latched position to another position, then back to its latched position.

10. A port security barrier system, comprising:

a plurality of floating port security barrier segments forming a port security barrier string;

an axially moveable latch disposed on an end of said port security barrier string, said latch adapted to engage a captured element thereby fixing said end to a fixed point;

a remotely operable thruster unit disposed proximal said latch on said end of said string of port security barriers, said thruster unit capable of rotatably moving said string from its latched position to another position, and back to said latched position, and a power unit operatively connected to said thruster unit;

a positional guidance system whereby a position of said port security barrier string can be monitored and said remotely operable thruster unit controlled to position said port security barrier string as desired; and a control system comprising a digital processor, said control system adapted to receive information from said latch and said thruster unit, and send information for control of same.

11. The system of claim 10, wherein said positional guidance system comprises a global positioning system (GPS).

12. The system of claim 11, further comprising a light detection and ranging (LiDAR) system.

13. The system of claim 10, wherein said positional guidance system comprises a light detection and ranging (LiDAR) system.

14. The system of claim 10, whereby said port security barrier string comprises two latches, one on each end of a port security barrier segment, and two captured elements on fixed points, each of said latches adapted to engage one of said captured elements; and wherein a thruster unit is disposed proximal each end of said port security barrier segment, whereby said port security barrier segment can be detached, at least partially rotated out of position, and moved in a desired direction from the remainder of said port security barrier string, forming an opening therein.

15. The system of claim 14, wherein said positional guidance system comprises a global positioning system (GPS).

16. The system of claim 15, wherein said positional guidance system comprises a light detection and ranging (LiDAR) system.

\* \* \* \* \*